UNITED STATES PATENT OFFICE.

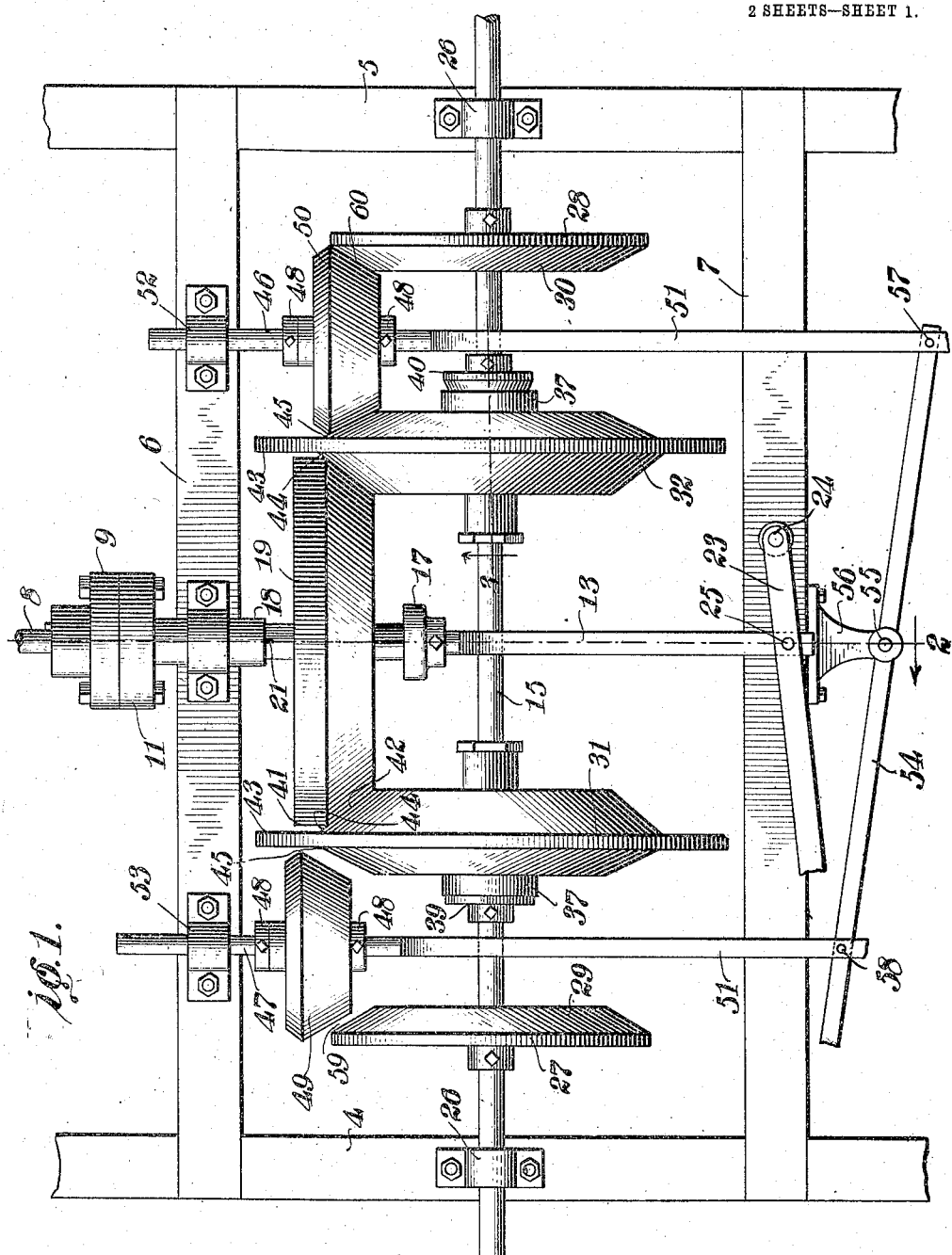

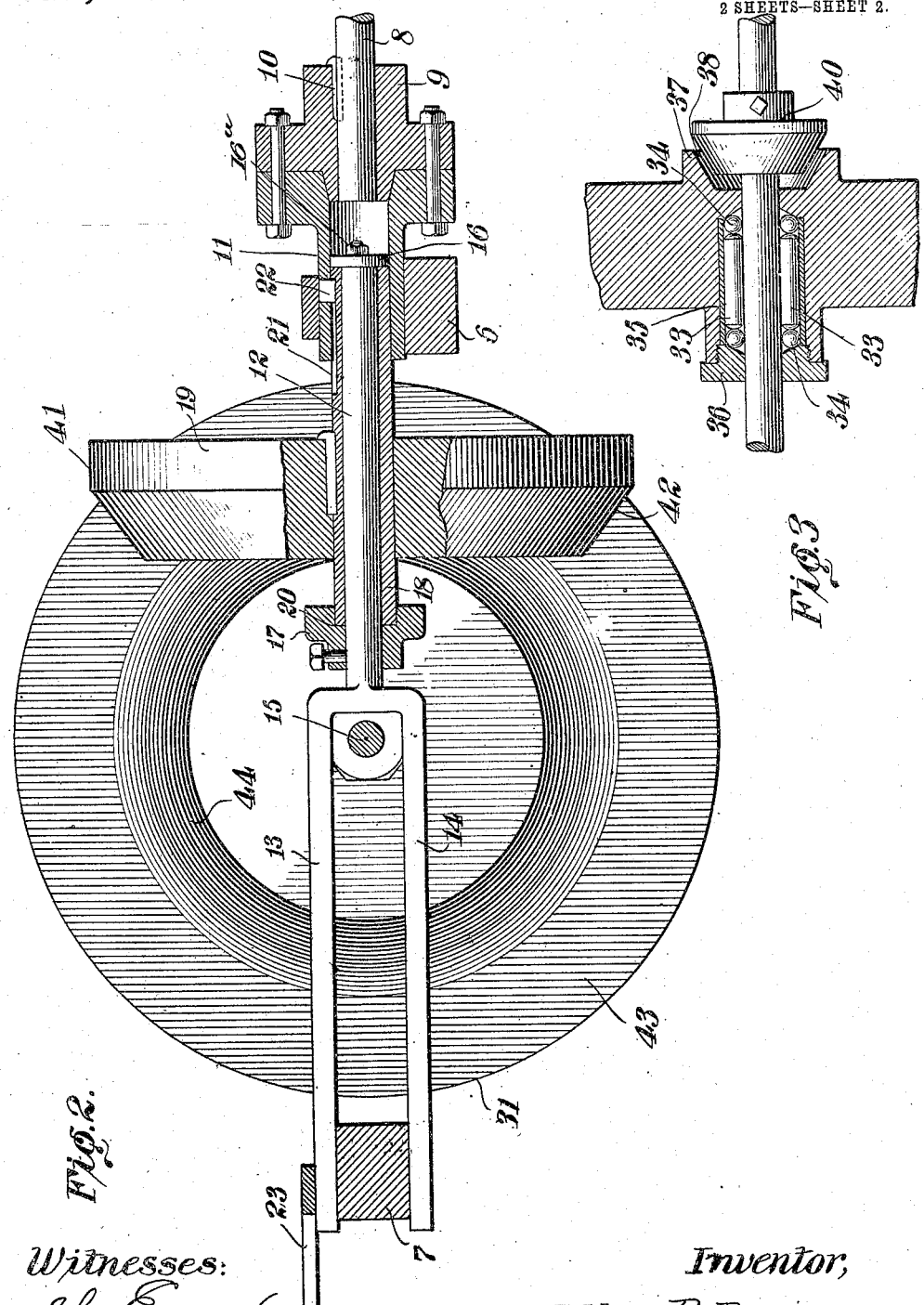

JOHN P. DAVIS, OF CHICAGO, ILLINOIS.

FRICTION-TRANSMISSION MECHANISM.

No. 911,847.    Specification of Letters Patent.    Patented Feb. 9, 1909.

Application filed September 27, 1907. Serial No. 394,844.

*To all whom it may concern:*

Be it known that I, JOHN P. DAVIS, a citizen of the United States, residing at Chicago, in the county of Cook and State of Illinois, have invented a new and useful Improvement in Friction-Transmission Mechanism, of which the following is a specification.

My primary object is to provide a construction of friction-transmission in which thrust upon its bearings will be reduced to the minimum and thus practically all of the power applied to the transmission shall be used for driving the driven-shaft instead of being diverted in a large measure to producing thrust upon the bearings.

Referring to the accompanying drawings—Figure 1 shows, by a plan view, a friction-transmission mechanism embodying my invention. Fig. 2 is a section taken at the line 2 on Fig. 1, viewed in the direction of the arrow and enlarged; and Fig. 3, a section taken at the line 3 on Fig. 1, viewed in the direction of the arrow and enlarged.

My invention, as illustrated in the drawings, is applied to an automobile construction in which the supporting frame for the parts of the mechanism comprises the side bars 4 and 5 and end bars 6 and 7. A drive-shaft 8, adapted to be driven from any suitable source, as by an automobile engine (not shown), has rigidly secured on one of its ends, as by a key 10, a head 9, formed preferably as shown in the drawings, and having a tubular extension 11 extending beyond the end of the shaft 10. A shaft 12 having a forked end providing legs 13 and 14 straddling a counter or driven-shaft 15 and the end bar 7, is provided at its opposite end with an expanded portion 16 in the form of a disk fastened on the inner end of the shaft 12, as by a bolt 16ᵃ. Between this disk 16 and a head 17, fixed to the shaft, a sleeve 18, carrying a friction-roller 19, is confinedly journaled on the shaft, the sleeve 18 fitting at one end in a recess 20 contained in the head 17. The sleeve 18 at its opposite end contains a longitudinal groove 21 in which a key 22 fixed in the extension 11, projects to cause the sleeve to be rotated with the shaft 8, and also to permit longitudinal movement of the sleeve with relation to the extension 11. The movement of the sleeve and the roller carried thereby may be accomplished by any suitable means, as for instance by the means shown which comprise a lever 23 fulcrumed to the bar 7 at one end, as indicated at 24, and pivoted between its ends, as indicated at 25, to the leg 13. Thus by operating the lever 23 the roller 19 may be moved toward and away from the shaft 15.

The shaft 15, which, in an automobile construction, may be the one geared to the driven-axle, is journaled, near its opposite ends, in bearings 26, 26, to be movable longitudinally therein and to extend at right angles to the shaft 8. The shaft 15 has fixed on it, near its opposite ends, within the frame sides, two friction-disks 27, 28, having beveled surfaces 29 and 30, respectively; and on this shaft between these disks are journaled a pair of friction-disks 31 and 32 to extend on opposite sides of the roller 19, these last-named disks being free to slide longitudinally of the shaft. Each of the disks 31 and 32 has roller bearings confined between it and the shaft 15, these bearings comprising a circular series of rollers 33, with balls 34 at their opposite ends confined in a bore 35 in each disk, by a cap 36, these bearings serving to reduce the friction between the disks 31 and 32 and shaft carrying them to the minimum, when the disks rotate in a direction opposite to that of the shaft, as hereinafter explained.

In the illustrated embodiment of my invention, means for alternately clutching the disks 31 and 32 to the shaft 15 are provided, the description of the preferable means being as follows: The outer faces of the hubs 37 of the disks 31 and 32 are provided with recesses 38 of frusto-conical shape in cross-section, as represented, these recessed hubs coöperating with cone clutches 39 and 40 fixed on the shaft 15 adjacent to the disks 31 and 32, respectively, for causing the disks to rotate with the shaft, as hereinafter explained.

The roller 19 has a flat periphery 41 and a beveled friction surface 42, and each of the disks 31 and 32 has a flat bearing surface 43 and beveled surfaces 44 and 45, the latter being arranged on opposite sides of the disk, with which flat surfaces 43 and beveled surfaces 44 the flat surface 41 and beveled surface 42, respectively, of the roller 19, are caused to coöperate, as hereinafter explained.

Journaled on the shafts 46 and 47, respectively, between collars 48 on these shafts, are friction-rollers 49 and 50, respectively. Each of the shafts 46 and 47 has a forked end affording legs, of which the upper one 51 of each shaft is shown, these legs straddling the shaft 15 and the bar 7. The opposite ends of the shafts 46 and 47 are slidably confined in guides 52 and 53, respectively, secured on the bar 6. The shafts 46 and 47 are thus adapted to be moved back and forth in their guides to move the rollers carried thereby toward and away from the shaft 15. Any suitable means for moving these rollers may be employed, the means shown, which serve to move them in opposite directions for producing reversal of the shaft, comprising a lever 54 fulcrumed between its ends, as indicated at 55 on a bracket 56 secured to the frame-bar 7, and pivoted on opposite sides of its fulcrum, as indicated at 57 and 58 between the legs of the respective shafts 46 and 47.

The friction surfaces of the rollers 49 and 50 are beveled, as indicated at 59 and 60 respectively, and serve to coöperate, as hereinafter explained, with the beveled surfaces on the respective disks 27 and 31, and 30 and 32.

When the lever 54 is moved to the position illustrated in Fig. 1, the roller 50, bearing at its beveled surface 60 against the beveled surfaces 30 and 45 of the rollers 28 and 32 respectively, and thus exerting a wedging action between them, moves the disk 32 to the left in Fig. 1. The roller 19, bearing, as for example as illustrated in Fig. 1 at its beveled surface, against the beveled surface 44 of the disk 32, arrests longitudinal movement of the disk 32 toward the left under the wedging action of the roller 50, and thus the continued wedging action of the last-referred to roller causes the disk 28 and with it the shaft 15 to move to the right in Fig. 1, thereby drawing the clutch 39 into engagement with the wall of the recess in the disk 31, with the result of clutching this disk to the shaft and drawing it into engagement with the roller 19. The clutches 37 are so positioned on the shaft as to cause one or the other to be moved out of operative engagement with its coöperating disk when the shaft is moved either to the right or left, as the case may be. Thus when the shaft is moved to the right, as just explained, to cause the clutch adjacent to the disk 31 to engage with the latter, the clutch adjacent to the disk 32 is moved out of engagement with that disk, as represented in Fig. 1. With the rollers 19 and 50 thus exerting wedging action between the disks 28, 32 and 31, the disk 32 being free to rotate upon its roller bearings about the shaft 15, operates as an idler, the disks 28 and 31 being thus caused to rotate in the same direction. Lateral thrust of the rollers 19 and 50 is thus directed in equal degrees against the disks 28 and 31, and thus end-thrust upon the shaft 15 is entirely eliminated. The speed of movement of the shaft 15 is regulated by moving the roller 19 toward and away from the shaft. In the position shown in Fig. 1, this roller contacts at its beveled surface 42 with the beveled surfaces 44 of the disks 31 and 32, and thus the shaft 15 is rotated at its greatest speed. To reduce the speed of rotation of the shaft, the lever 23 may be operated to move the roller 19 toward the periphery of the disks 31 and 32, to cause its flat surface 41 to engage with the flat surfaces 43 of these disks, this engagement being effected by the wedging action of the roller 50 against the disks 28 and 32.

The reversal of the shaft 15 is effected by swinging the lever 54 in the direction opposite that described, thereby moving the roller 50 out of engagement with the disks 28 and 32 and causing the roller 49 to wedge between the disks 27 and 31, in a manner similar to that described of the roller 50, with the result of disengaging the clutch from the disk 31, and by further movement of the shaft 15 to the left in the drawings, causing the other clutch to engage the disk 32. The rollers 19 and 49 are thus caused to engage with the disks 27, 31 and 32, and the shaft 15 is thereby rotated in the opposite direction, the disk 31 operating upon such reversal as an idler.

It will be noted that when the roller 19 is moved into engagement with the disks, into position for driving the shaft in either direction, the force exerted laterally by the roller 19 is equalized, and thus end-thrust against the bearings of the shaft is entirely eliminated, and the power which is upward of 150 pounds pressure is thus made use of by my construction for driving the driven-shaft.

By providing a construction of friction transmission mechanism, whereby the drive-roller is constructed to be moved toward the axis of the driven-roller and against a bevel friction face for producing high speed transmission, and moved away from the axis of the drive-roller to produce low speed transmission, the maximum degree of efficiency in power, especially when running on low speed, is effected.

It will also be noted that by constructing transmission-mechanism in accordance with my invention, the pressure exerted between the disks and rollers may be varied at will to produce the degree of pressure required under varying loads. Thus, when a light load is carried by the engine, the contact of these disks and rollers may be caused to be comparatively light, whereas when the load is heavy the contact pressure may be quickly and readily increased to that required, with the result that the engine is caused to perform the work required without waste of energy from excess contact pressure between the disks and rollers.

What I claim as new, and desire to secure by Letters Patent, is—

1. In a roller-transmission mechanism, the combination of a driven-shaft, a pair of coöperating friction-disks supported to rotate with said shaft, a third disk supported between said pair of disks to rotate independently of the driven-shaft and be movable longitudinally, a drive-shaft, a roller provided on the drive-shaft and movable into engagement with a disk of said pair and with said third disk, and means constructed and arranged to be moved into and out of driving engagement with the other disk of said pair and said third disk for equalizing lateral thrust on the driven-shaft.

2. In a roller-transmission mechanism, the combination of a driven-shaft, a pair of coöperating friction-disks supported to rotate with said shaft, a third disk supported between said pair of disks to rotate independently of the driven-shaft and be movable longitudinally, a drive-shaft, a roller provided on the drive-shaft and movable into engagement with a disk of said pair and with said third disk, a third shaft, and a roller on said third shaft adapted to be moved into and out of driving engagement with the other disk of said pair and with said third disk.

3. In a roller-transmission mechanism, the combination of a driven-shaft, a pair of coöperating friction-disks on said shaft, a third disk journaled and movable longitudinally of the shaft between said pair, a drive-shaft, a roller carried by the drive shaft and movable into engagement with a disk of said pair and with said other disk, a third shaft, and a roller carried by said third shaft and adapted to be moved into and out of driving engagement with the other disk of said pair and with said third disk.

4. In a roller-transmission mechanism, the combination of a driven-shaft, a pair of coöperating friction-disks provided with beveled-surfaces on said shaft, a third disk having beveled friction-surfaces and movable longitudinally of the shaft between said pair, a drive-shaft, a roller provided on said drive-shaft and having a beveled friction-surface movable into engagement with a disk of said pair and with said third disk, a third shaft, and a roller carried by said last-named shaft having a beveled surface and movable into engagement with the other disk of said pair and with said third disk.

5. In a roller-transmission mechanism, the combination of a driven-shaft mounted to move longitudinally, a pair of friction-disks carried by said shaft and movable therewith and a third disk rotatable independently of the shaft and movable longitudinally thereof, a drive-shaft, a roller on said drive-shaft, and a second roller, said rollers coöperating with said disks, for the purpose set forth.

6. In a roller-transmission mechanism, the combination of a drive-shaft, a friction-roller carried by said shaft, a driven-shaft, a pair of disks on said driven shaft adapted to rotate with it, an idler friction-disk journaled on the shaft between said pair of disks, and an idler-roller, said friction roller and idler-roller coöperating with said disks and constructed and arranged to be moved into and out of driving engagement with the respective disks, for the purpose set forth.

7. In a roller-transmission mechanism, the combination of a drive-shaft, a friction-roller carried by said shaft, a driven-shaft, a disk fixed on the driven-shaft and a pair of disks journaled on said driven shaft in position to be engaged by said friction-roller, an idler-roller journaled in position to engage with said fixed disk and the adjacent disk of said pair, and means for clutching the other disk of said pair to the shaft, for the purpose set forth.

8. In a roller-transmission mechanism, the combination of a drive-shaft, a friction roller carried by said shaft, a driven shaft slidable longitudinally in its bearings, a disk fixed on said driven-shaft to rotate therewith, a pair of disks journaled on said driven-shaft in position to be engaged by said friction roller, an idler-roller journaled in position to engage with said fixed disk and the adjacent disk of said pair, and means movable with said shaft to engage with the other of said pair, for clutching it to the shaft, for the purpose set forth.

9. In a roller-transmission mechanism, the combination of a drive-shaft, a friction-roller carried by said shaft, a driven shaft, friction-disks carried by said driven-shaft with relation to which said roller is adjustable on its shaft into engagement with a pair of said disks, and a pair of idler-rollers adapted to be alternately moved into engagement with the adjacent coöperating disks, for the purpose set forth.

10. In a roller-transmission mechanism, the combination of a drive-shaft, a friction-roller carried by said shaft, a driven-shaft, a pair of disks carried by said driven shaft and movable with the shaft, a pair of disks journaled thereon between said first-named pair in position to be engaged by said roller, idler-rollers journaled in position to be moved into engagement with the adjacent one of said first pair of disks and the adjacent one of said second pair of disks, and means for clutching the disk of said second pair, which is out of engagement with the idler, to the shaft, for the purpose set forth.

11. In a roller-transmission mechanism, the combination of a drive-shaft, a friction-roller carried by said shaft, a driven shaft, a pair of disks carried by said driven-shaft and movable with the shaft, a pair of disks journaled thereon between said first-named pair in position to be engaged by said roller, idler-rollers journaled in position to be moved into engagement with the adjacent one of said first pair of disks and the adjacent one of said second pair of disks, and clutches carried by the driven-shaft and constructed and arranged to alternately clutch the disks of said second pair to the shaft by movement of the shaft in opposite directions, for the purpose set forth.

12. In transmission mechanism, the combination of a driven-shaft, a rotatable member carried by said shaft, a drive-shaft, a head carried by said drive shaft and provided with a tubular extension projecting beyond the shaft, a support extending at one end into said tubular extension, a sleeve rotatably confined on said support, a rotatable member on said sleeve coöperating with said first-named rotatable member, and means for moving said forked support to move it and the sleeve in said tubular extension.

13. In transmission mechanism, the combination of a driven-shaft, a rotatable member carried by said shaft, a drive-shaft, a head carried by the drive-shaft and having a tubular extension projecting beyond the shaft, a support for the outer end of the drive-shaft having a cylindrical portion terminating in a head, a second head on said cylindrical portion of the support, a sleeve rotatably confined between said heads on said cylindrical portion, a rotatable member secured on said sleeve to rotate with it, and means for moving said support and sleeve in the tubular extension longitudinally thereof.

14. In a roller-transmission mechanism, the combination of a driven-shaft, a pair of coöperating friction-disks supported to rotate with said shaft, a third disk supported between said pair of disks to rotate independently of the driven-shaft and be movable longitudinally thereof, a drive-shaft, a roller on the drive-shaft movable into engagement with a disk on said pair and with said third disk, and means adapted to be moved into and out of driving engagement with the other disk of said pair, and with said third disk to act against said disks and communicate power from one disk to the other.

15. In a roller-transmission mechanism, the combination of a driven-shaft, a pair of coöperating friction disks supported to rotate with said shaft, a third disk supported between said pair of disks to rotate independently of the driven-shaft and be movable longitudinally thereof with respect to said pair of disks, a drive-shaft extending at right-angles to the driven-shaft and with respect to which said pair of disks and said third disk are movable transversely thereof, a roller provided on the drive-shaft and movable into engagement with the disk of said pair and with said third disk, and means operating between the other disk of said pair and said third disk, for the purpose set forth.

16. In a roller-transmission mechanism, the combination of a drive-shaft, a friction roller carried by said shaft, a driven-shaft, a pair of disks supported by said driven-shaft and adapted to rotate with it, one of said disks having a beveled face, an idler friction-disk carried on the driven shaft between said pair of disks and having a beveled face opposed to the beveled face on the disk of said pair, and an idler-roller having a beveled portion, said friction roller and idler-roller coöperating with said disks, for the purpose set forth.

17. In a roller-transmission mechanism, the combination of a rotary shaft, a pair of coöperating friction-disks supported to rotate with said shaft, a third disk supported on said shaft between said pair of disks to rotate independently of said shaft and be movable longitudinally with relation to said pair of friction disks, a second shaft, a roller provided on said second shaft and movable into engagement with a disk of said pair and with said third disk, and means constructed and arranged to be moved into and out of driving engagement with the other disk of said pair and with said third disk for moving the disks which are engageable by said roller into engagement with the latter and equalizing end-thrust on said friction-disks, said pair of disks being movable in a direction transversely of said roller and the said last-named means, for the purpose set forth.

JOHN P. DAVIS.

In presence of—
R. A. SCHAEFER,
L. KIRKLAND.